US010531296B2

(12) United States Patent
Baldischweiler et al.

(10) Patent No.: US 10,531,296 B2
(45) Date of Patent: Jan. 7, 2020

(54) METHOD FOR LOADING A SUBSCRIPTION INTO AN EMBEDDED SECURITY ELEMENT OF A MOBILE TERMINAL

(71) Applicant: GIESECKE+DEVRIENT MOBILE SECURITY GMBH, Munich (DE)

(72) Inventors: Michael Baldischweiler, Munich (DE); Claus Dietze, Obersochering (DE)

(73) Assignee: GIESECK+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/078,284

(22) PCT Filed: Feb. 27, 2017

(86) PCT No.: PCT/EP2017/000269
§ 371 (c)(1),
(2) Date: Aug. 21, 2018

(87) PCT Pub. No.: WO2017/148581
PCT Pub. Date: Sep. 8, 2017

(65) Prior Publication Data
US 2019/0069171 A1    Feb. 28, 2019

(30) Foreign Application Priority Data
Mar. 1, 2016    (DE) .................. 10 2016 002 508

(51) Int. Cl.
*H04W 12/06* (2009.01)
*H04W 8/20* (2009.01)
(Continued)

(52) U.S. Cl.
CPC ............ *H04W 12/06* (2013.01); *G06F 12/14* (2013.01); *G06F 21/78* (2013.01);
(Continued)

(58) Field of Classification Search
CPC . H04W 12/04; H04W 12/06; H04W 12/0023; H04W 8/205; H04W 4/60;
(Continued)

(56) References Cited

U.S. PATENT DOCUMENTS

2013/0111546 A1    5/2013    Gargiulo et al.
2014/0020114 A1    1/2014    Bhatia et al.
(Continued)

FOREIGN PATENT DOCUMENTS

DE    102013013178 A1    2/2015

OTHER PUBLICATIONS

"Remote Provisioning Architecture for Embedded UICC Technical Specification," GSM Association, Version 3.0, Jun. 30, 2015, 301 Pages.
(Continued)

*Primary Examiner* — Wayne H Cai
(74) *Attorney, Agent, or Firm* — Workman Nydegger

(57) ABSTRACT

A method for loading a subscription into an embedded security element of a system configured on a chip of a mobile end device, wherein the system comprises an application processor, a non-volatile memory and a secure processor. The application processor and the secure processor can access the non-volatile memory via a bus. In the process, the subscription is loaded by a provisioning service into the non-volatile memory, so that the secure processor can load the subscription from the memory and execute it. The provisioning service is executed by the secure processor and the subscription is loaded by the provisioning service into a region of the non-volatile memory readable and writeable only by the secure processor.

14 Claims, 3 Drawing Sheets

(51) Int. Cl.
   *H04W 12/04* (2009.01)
   *H04W 4/60* (2018.01)
   *G06F 21/78* (2013.01)
   *G06F 12/14* (2006.01)
   *H04W 12/00* (2009.01)
   *H04L 29/06* (2006.01)
   *H04W 60/00* (2009.01)

(52) U.S. Cl.
   CPC ...... *H04L 63/0853* (2013.01); *H04L 63/0876* (2013.01); *H04W 4/60* (2018.02); *H04W 8/205* (2013.01); *H04W 12/0023* (2019.01); *H04W 12/04* (2013.01); *H04W 60/00* (2013.01)

(58) Field of Classification Search
   CPC ..... G06F 21/78; G06F 12/14; H04L 63/0853; H04L 63/0876
   See application file for complete search history.

(56) References Cited

U.S. PATENT DOCUMENTS

| | | |
|---|---|---|
| 2014/0089682 A1 | 3/2014 | Gulati et al. |
| 2014/0223569 A1 | 8/2014 | Gail et al. |
| 2015/0304506 A1* | 10/2015 | Zhu ............... H04M 15/49 455/406 |
| 2015/0347786 A1 | 12/2015 | Yang et al. |
| 2016/0007188 A1 | 1/2016 | Wane |
| 2017/0196026 A1* | 7/2017 | Daoud ............... H04W 4/021 |

OTHER PUBLICATIONS

Park et al., "Secure Profile Provisioning Architecture for Embedded UICC," 2013 International Conference on Availability, Reliability, and Security, Sep. 2-6, 2013, pp. 297-303.

German Search Report from DE Application No. 102016002508.5, dated Dec. 9, 2016.

International Search Report from PCT Application No. PCT/EP2017/000269, dated May 9, 2017.

* cited by examiner

METHOD FOR LOADING A SUBSCRIPTION INTO AN EMBEDDED SECURITY ELEMENT OF A MOBILE TERMINAL

BACKGROUND

The invention relates to a method for loading a subscription into an embedded security element of a system configured on a chip of a mobile end device, wherein the system comprises an application processor, a non-volatile memory and a secure processor, wherein the application processor and the secure processor can access the non-volatile memory via a bus. The subscription is loaded by a provisioning service into the non-volatile memory, so that the secure processor can load the subscription from the memory and execute it.

A UICC (Universal Integrated Chip Card) is a chip card having a chip-card operating system optimized for chip-card applications in telecommunications. The UICC is the basis for the so-called USIM (Universal Subscriber Identity Modul). The USIM is the carrier of the identity of a mobile communication subscriber and as the main task has the ensuring of the authenticity of a mobile end device, e.g. of a mobile telephone, vis-à-vis a mobile communication network (in short: network) and vice versa. Additional objects are a tamper-resistant execution of programs, a user identification by means of a code, the so-called PIN (Personal Identification Number), as well as the storing of data, such as for example phone numbers. In the past, the UICC was usually designed as a plug-in card, which was inserted into a corresponding reader unit of the mobile end device.

In the future it is envisaged to provide the UICC in integrated (iUICC) or embedded (eUICC) form. These components, also designated as security element, are provided in integrated or embedded form of a system configured on a chip (known as system-on-a-chip) of the mobile end device. To be able to take over the above-described functions and tasks, it is necessary to provide an image of the iUICC or iUICC in a memory of the system of the mobile end device. A Load Provisioning Agent (LPA) executed in the application processor is utilized for loading the image of the iUICC or eUICC into the non-volatile memory. The memory area in which the image is deposited can be deleted relatively simply by a malware, whereby a Denial of Service (DoS) attack is enabled.

SUMMARY

It is an object of the present invention to state a method for loading a subscription into an embedded security element of a system configured on a chip of a mobile end device, which prevents or at least impedes the carrying out of a DoS attack on the image of an iUICC or eUICC. A further object consists in stating an accordingly configured mobile end device and an apparatus comprising the end device as well as a mobile communication network.

These objects are achieved by a method according to the features of the claim 1, a mobile end device according to the features of the claim 13 as well as an apparatus according to the features of the claim 14. Advantageous embodiments can be found in the dependent claims.

The invention proposes a method for loading a subscription into an embedded security element of a system configured on a chip of a mobile end device, wherein the system comprises an application processor, a non-volatile memory and a secure processor. The application processor and the secure processor can access the non-volatile memory via a bus. In the method, the subscription is loaded by a provisioning service, the so-called Load Provisioning Agent (LPA), into the non-volatile memory, so that the secure processor can load the subscription from the memory and execute it. According to the invention is provided that the provisioning service is executed by the secure processor and the subscription is loaded by the provisioning service into a region of the non-volatile memory readable and writeable only by the secure processor.

The method is based on the consideration that a DoS attack is made possible by the fact that in current realizations the provisioning service is executed in the application processor which has an access to the region of the non-volatile memory associated with the secure processor in order to import the image of the subscription into the non-volatile memory. The application processor therefore has the possibility of accessing regions of the secure processor in a reading or writing manner, without this being effected under the control of the secure processor. With it, this memory area, in which the image of the subscription is stored, is no longer exclusively associated with the secure processor, whereby in conventional realizations a DoS attack is enabled.

The method according to the invention makes a dynamic loading of the subscription possible, while circumventing the above-mentioned problems, by having the provisioning service itself already executed by the secure processor. Thereby the loading of the subscription also remains under the control of the secure processor. A DoS attack can thereby be prevented.

Thereby the security of the overall system, i.e. of the system configured on a chip of the mobile end device as well as the mobile end device itself, is significantly increased. A memory area of the secure processor can be associated unambiguously and exclusively with the secure processor, because other applications do not have to access this or are not allowed to.

The mobile end device is in particular a mobile communication end device. A mobile end device can be understood to be a tablet PC, a smart device, a smartphone, a laptop, a wearable and a device used in the IoT (Internet of Things).

An expedient embodiment provides that the system (configured on a chip) of the mobile end device is associated with an unambiguous identifier, wherein the identifier comprises a public key of the mobile end device. The unambiguous identifier can be configured, for example, as a device certificate and comprise the public key (PuK) of the mobile end device.

Expediently, the unambiguous identifier is employed for the purpose that the mobile end device logs in to a mobile communication network with the unambiguous identifier. The application while employing the unambiguous identifier is effected expediently before the loading of the subscription as well as before the loading of the provisioning service into the secure processor.

In an expedient embodiment, the system receives the provisioning service from a mobile network operator, wherein the provisioning service is encrypted and/or signed with the public key of the mobile end device. This is made possible by the fact that the mobile network operator obtains access to the data sets of the manufacturers of the mobile end devices and thereby has the possibility to verify the unambiguous identifiers which are associated with respective mobile end devices. The mobile network operator can thereby associate the key (PuK) matching the mobile end device with the unambiguous identifier and employ said key.

As a result of this, the encryption of the provisioning service with the public key of the mobile end device is made possible.

According to a further expedient embodiment, the provisioning service, which is already verified and/or decrypted by the mobile end device, is loaded into the secure processor of the system of the mobile end device. In particular, the provisioning service is loaded, immediately after its reception, into the secure memory of the mobile end device. Thereupon the provisioning service is executed in the secure processor.

According to a further embodiment, the subscription is loaded by the provisioning service from the mobile network operator and is deposited in the region of the non-volatile memory readable only by the secure processor. With the help of the provisioning service, the image of the iUICC or eUICC matching the mobile end device can now be loaded including the subscription. Thereupon or at a later time point, the secure processor can then load the image from the non-volatile memory, more precisely the region of the non-volatile memory readable only by the secure processor, verify said image and execute it.

Expediently, the provisioning service is deleted from the secure processor after the loading and storing of the subscription. With it, the provisioning service is no longer available for a further utilization.

It is expedient if the provisioning service comprises a means which allows only a one-time utilization of the provisioning service for the loading or a change of the subscription. Such a means can be, for example, a consecutive counter, a time stamp, a recoding method or session keys. With such derivation mechanisms it can be ensured that no replica of the already utilized provisioning service is created and executed. Upon a change of the image of the iUICC or eUICC, an update of the image of the iUICC, the eUICC, or of a profile or a profile data update, respectively a new provisioning service is required which is loaded and executed as described above. The security of the overall system is thereby additionally distinctly increased. Upon the loading of the utilization service it can in fact not be avoided that an image of the provisioning service is loaded and intermediately stored. However, the impossibility of multiple utilization of the provisioning service prevents the execution of a replay attack or a rollback method.

The invention further proposes a mobile end device which has a system configured on a chip comprising a bus, an application processor, a non-volatile memory and a secure processor, wherein the application processor and the secure processor can access the non-volatile memory via the bus, wherein the mobile end device is configured to load the subscription by a provisioning service into the non-volatile memory, so that the secure processor can load and execute the subscription from the memory. The mobile end device is characterized by the fact that this is further configured to execute the provisioning service by the secure processor and to load the subscription by the provisioning service into a region of the non-volatile memory readable and writeable only by the secure processor.

The mobile end device according to the invention is further configured for carrying out the above-described steps of the method according to the invention. This has the same advantages as those described above in connection with the method according to the invention.

Finally, the invention proposes an apparatus for loading a subscription into an embedded security element of a mobile end device which comprises a mobile end device of the herein-described kind as well as a computing unit of the mobile communication system. The mobile end device and the computing unit in combination are configured for exchanging data for carrying out the method of the hereinabove and hereinafter description.

BRIEF DESCRIPTION OF THE DRAWINGS

The invention will hereinafter be explained more closely with reference to an exemplary embodiment in the drawing.

DETAILED DESCRIPTION OF VARIOUS EMBODIMENTS

Figure 3:
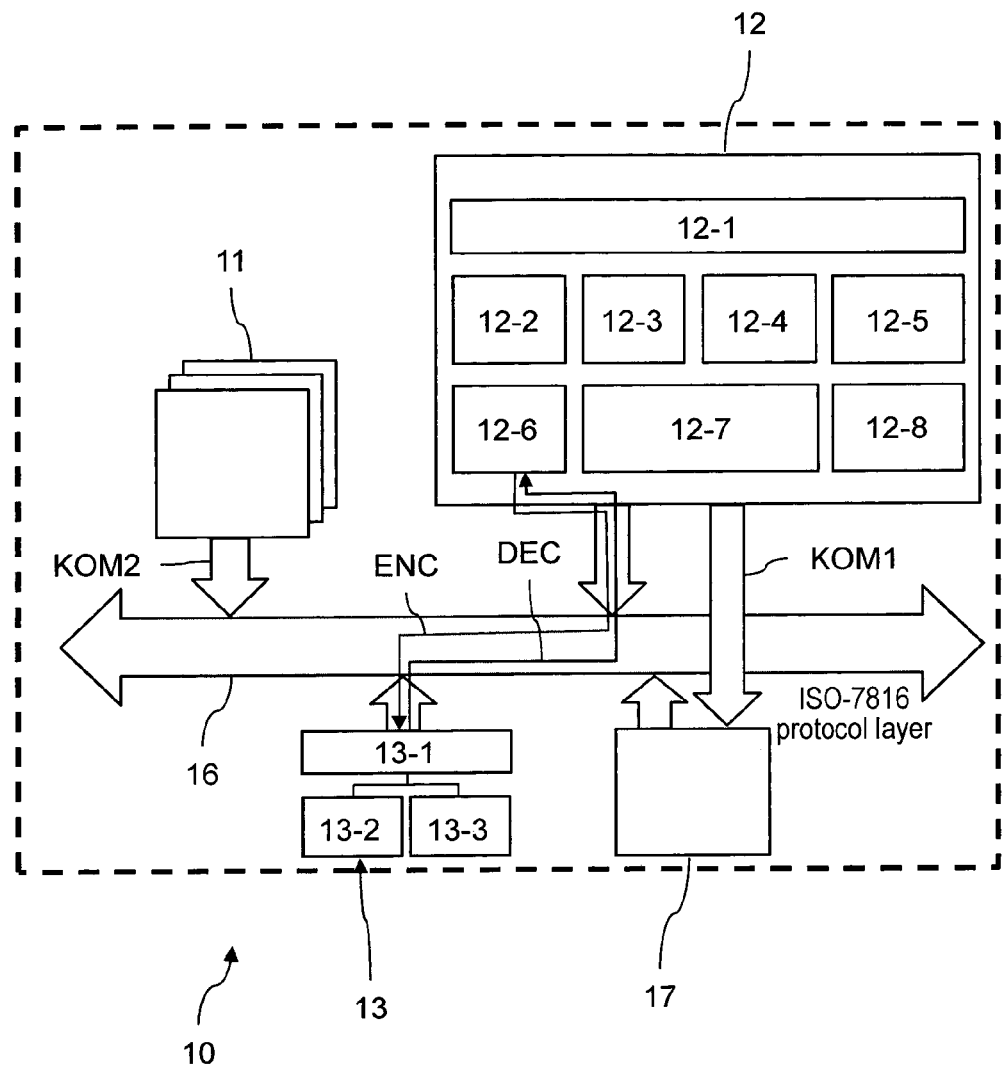
FIG. 3 a schematic representation of a system configured on a chip (System-on-a-Chip, SoC) of a mobile end device.

FIG. 3 shows a schematic representation of the construction of an SoC of a mobile end device 10. The SoC comprises an application processor 11 (core), a secure processor 12, a non-volatile memory 13, a bus 16 and a computing unit 17. The application processor 11 can comprise a number (here: 3) of processor cores on which respectively different applications run. The secure processor 12 comprises a CPU 12-1, an OTP region 12-2, a non-volatile memory (ROM) 12-3, a volatile memory (SP-RAM) 12-4, a cryptography unit 12-5, a memory manager 12-6, an input/output unit 12-7 as well as a key management unit 12-8. The non-volatile memory 13 comprises a memory control 13-1, an embedded memory area 13-2 as well as a further memory area 13-3.

The application processor 11 as well as the secure processor 12 can communicate with the non-volatile memory 13 via the bus 16. In the process, a communication of the secure processor 12 with the non-volatile memory 13 is effected in encrypted form (arrows ENC, DEC). This means, data written to the non-volatile memory are encrypted (ENC), data read out from the non-volatile memory by the secure processor 12 are decrypted (DEC). A communication KOM1 between the secure processor 12 and the computing unit 17 is effected directly and while circumventing the bus 16 likewise in encrypted form. In contrast, the communication KOM2 between the application processor 11 and the non-volatile memory 13 can be effected in unencrypted form.

Figure 1:
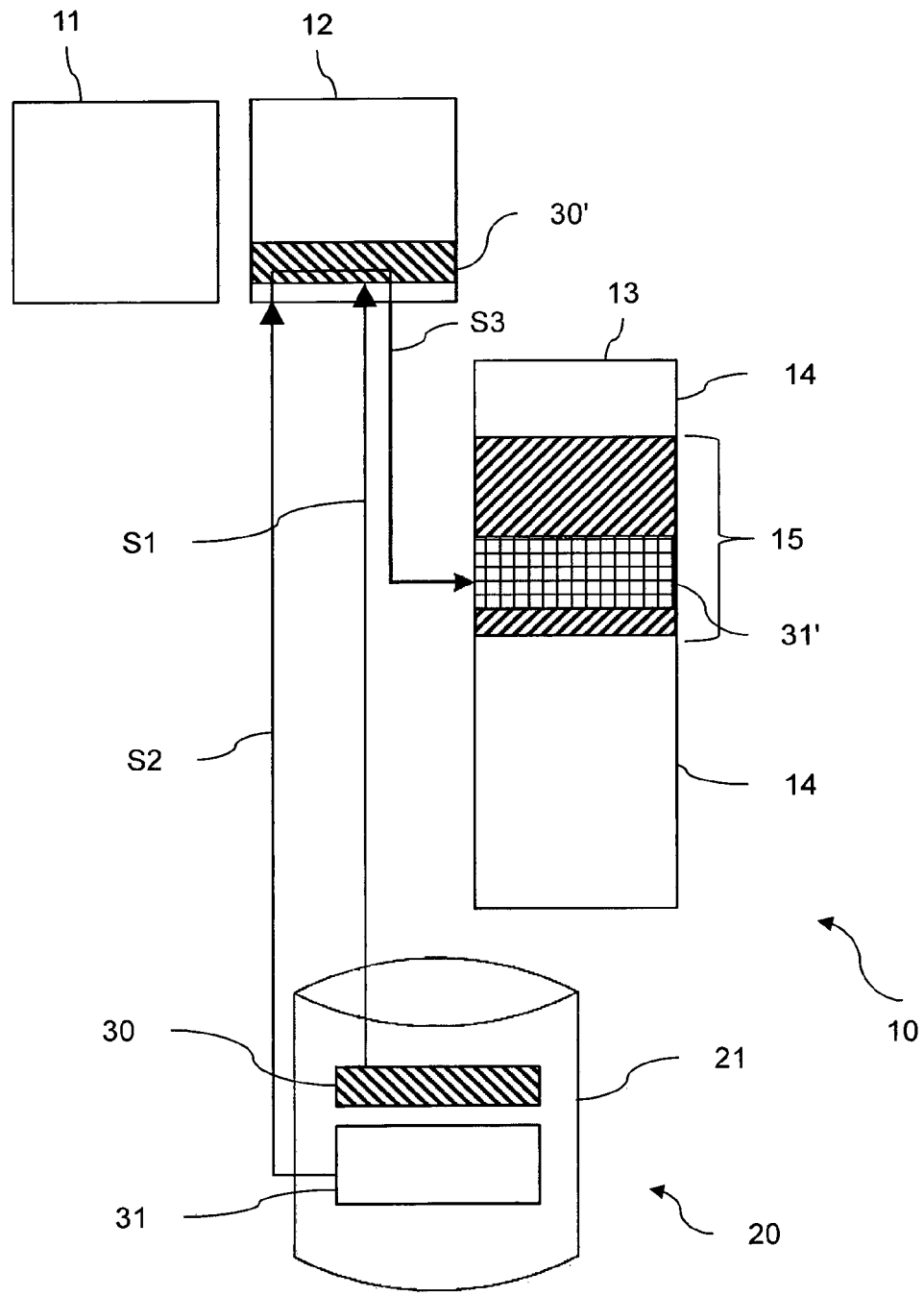
FIG. 1 a schematic representation of an apparatus for loading a subscription into an embedded security element of a mobile end device according to the invention.
Figure 2:
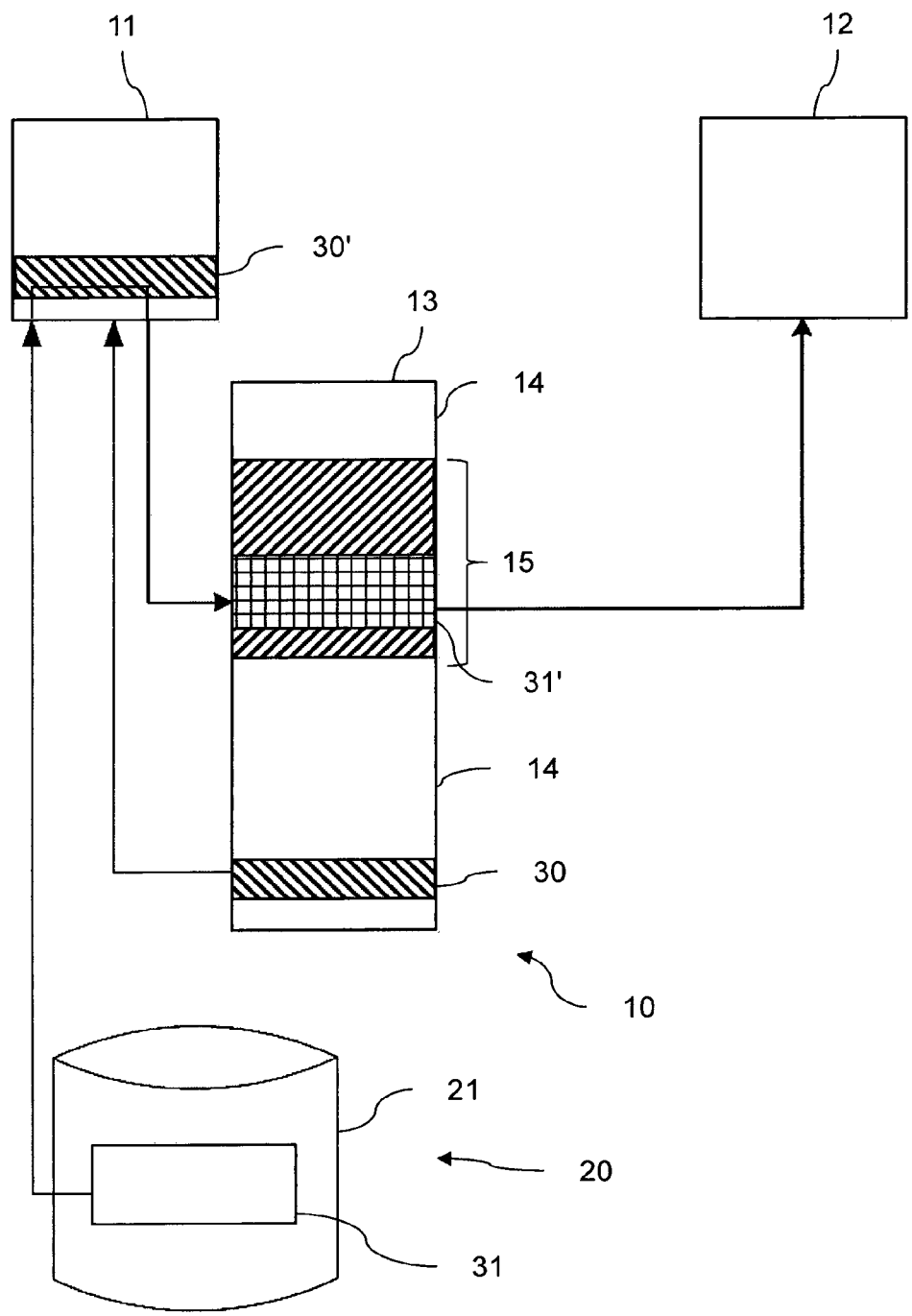
FIG. 2 a schematic representation of an apparatus for loading a subscription into an embedded security element of a mobile end device according to the prior art.

In a manner known to the skilled person, different memory areas 14, 15 of the non-volatile memory 13 are assigned to the application processor 11 and the secure processor 12 (compare FIGS. 1 and 2). It is thereby to be prevented that secure data of the secure processor 12 in the non-volatile memory 13 can be accessed from an application of the application processor 11.

FIG. 2 shows a schematic representation of an apparatus for loading a subscription into an embedded security element of a mobile end device 10 as is configured in FIG. 1. In the process, FIG. 2 shows the hitherto applied proceeding.

The reference numeral 20 denotes a mobile communication network. The reference numeral 21 represents a memory in which an image 31 of a UICC is stored. The image 31 of the UICC is read out by a provisioning service 30' (Load Provisioning Agent, LPA), which is executed in the application processor 11, from the memory 21 of the mobile communication network 20 and is stored as image 31' in a memory area 15 of the non-volatile memory 13 of the SoC of the mobile end device 10 which is reserved for the secure processor 12. For this purpose, the application processor 11 has previously read out the provisioning service 30 (LPA) from a memory area 14 of the non-volatile memory 13 which is available to the application processor 11 for utilization. In the conventional solution, the provisioning service 30 (LPA) is thus executed in the application processor 11. To be able to make the image of the UICC 31 available to the secure processor 12, the application processor 11 obtains access to the memory area 15 of the non-volatile memory 13 which is reserved for the secure processor 12. However, a DoS attack is thereby made possible.

In contrast, FIG. 1 shows the procedure according to the invention. In this procedure, the provisioning service 30 (LPA) of the mobile communication network work 20 is loaded directly into the secure processor 12 of the SoC of the mobile end device 10. Here it is again denoted as provisioning service 30' (LPA). From the secure processor 12, the provisioning service 30' (LPA) loads the image 31 of the UICC from the mobile communication network 20. In turn, this image 31 is stored in the memory area 15 of the non-volatile memory 13 which is provided for the secure processor 12. Here the image of the UICC is denoted with 31'. By this procedure, a DoS attack can be prevented and the security of the overall system be increased, because the memory area 15 is read and written to exclusively by the secure processor 12. An access by the application processor 11 is not required.

The procedure of storing the image of the UICC 31 and the associated subscription in the memory area 15 of the non-volatile memory 13 according to the invention is as follows: An unambiguous identifier (ID) is assigned to the SoC of mobile end device 10. The identifier ID is incorporated into the SoC upon the manufacture of the mobile end device 10. The identifier ID can be configured as a device certificate and comprise a public key (PuK) of the mobile end device 10. The identifier ID is utilized for initially logging in the mobile end device 10 at the mobile communication network 20. Components required for this are represented in none of the figures.

The network operator of the mobile communication network 20 has access to the data sets of the manufacturer of the mobile end device 10 and therefore has the possibility of verifying the identifier ID. The mobile network operator associates keys (i.e. the public key) matching the mobile end device 10 with the identifier ID and employs this for encrypting and signing the provisioning service 30 (LPA). The signed and encrypted provisioning service 30' is transferred to the mobile end device 10 via the mobile communication network 20, a cloud or another wireless network (compare S1 in FIG. 1) and is loaded into the secure processor 12. There, the encrypted provisioning service 30' (LPA) is verified, decrypted and executed. Through the execution of the provisioning service 30' (LPA), the image of the UICC matching the mobile end device 10 is now loaded including the subscription (S2) and deposited in the memory area assigned to the secure processor 15 (S3 of FIG. 1). At a later time point, the secure processor 12 draws the image of the UICC from the memory 15 into its runtime environment, verifies said image and executes it.

After this operation, the provisioning service 30' (LPA) itself is deleted and therefore no longer available for further activities. In addition, the provisioning service 30' (LPA) contains a mechanism, such as a consecutive counter, a time stamp, a recoding method, session keys or other derivation mechanisms to ensure that no replica of the already utilized provisioning service 30' (LPA) is created several times and executed. Upon a change of the image of the UICC, an update of the image or a profile or profile data update, respectively a new provisioning service (LPA) is required which is loaded into the secure processor 11 and executed, as described above.

LIST OF ITEMS 10 mobile end device
11 application processor
12 secure processor
12-1 CPU
12-2 OTP region
12-3 non-volatile memory (ROM)
12-4 volatile memory (RAM)
12-5 cryptography unit
12-6 memory manager
12-7 input/output unit
12-8 key management unit
13 memory
13-1 memory control
13-2 embedded memory area
13-3 memory area
14 memory area
15 memory area
16 bus
17 computing unit
20 mobile communication network
21 memory
30 provisioning service (LPA)
30' provisioning service (LPC)
31 UICC Image
31' UICC Image
S1, S2, S3

The invention claimed is:

1. A method for loading a subscription into an embedded security element of a system configured on a chip of a mobile end device,
wherein the system comprises an application processor, a non-volatile memory and a secure processor,
wherein the application processor and the secure processor can access the non-volatile memory via a bus, in which
the subscription is loaded by a provisioning service into the non-volatile memory, so that the secure processor can load the subscription from the non-volatile memory and execute it,
wherein
the provisioning service is executed by the secure processor,
the subscription is loaded by the provisioning service into a region of the non-volatile memory readable and writeable only by the secure processor,
the provisioning service is loaded into the secure processor, and
wherein the provisioning service is deleted from the secure processor after the loading and storing of the subscription.

2. The method according to claim 1, wherein an unambiguous identifier, which comprises a public key of the mobile end device, is associated with the system of the mobile end device.

3. The method according to claim 2, wherein the mobile end device logs in to a mobile communication network with the unambiguous identifier.

4. The method according to claim 1, wherein the system receives the provisioning service from a mobile network operator, wherein the provisioning service is encrypted and/or signed with the public key of the mobile end device.

5. The method according to claim 4, wherein the mobile network operator associates the unambiguous identifier with the public key associated with the mobile end device.

6. The method according to claim 1, wherein the provisioning service is loaded into the secure processor immediately after reception.

7. The method according to claim 6, wherein the provisioning service is executed in the secure processor.

8. The method according to claim 1, wherein the subscription is loaded by the provisioning service from the mobile network operator and is deposited in the region of the non-volatile memory readable only by the secure processor.

9. The method according to claim 1, wherein the secure processor loads an image of the subscription from the non-volatile memory, optionally verifies said image, and executes it.

10. The method according to claim 1, wherein the provisioning service comprises a means which allows only a one-time utilization of the provisioning service for the loading or a change of the subscription.

11. The method according to claim 1, wherein the provisioning service comprises a Load Provisioning Agent (LPA).

12. The method according to claim 1, wherein the subscription comprises an image of an integrated universal integrated chip card (iUICC) or of an embedded universal integrated chip card (eUICC).

13. A mobile end device which has a system configured on a chip comprising a bus, an application processor, a non-volatile memory and a secure processor,
wherein the application processor and the secure processor can access the non-volatile memory via the bus,
wherein the mobile end device is configured to load the subscription by a provisioning service into the non-volatile memory, so that the secure processor can load the subscription from the non-volatile memory and execute it,
wherein
the mobile end device is further configured to
load the provisioning service into the secure processor and to execute it by the secure processor,
load the subscription by the provisioning service into a region of the non-volatile memory readable and writeable only by the secure processor, and to
delete the provisioning service from the secure processor after the loading and storing of the subscription.

14. An apparatus for loading a subscription into an embedded security element of a mobile end device, comprising a mobile end device according to claim 13 and a computing unit of the mobile communication system, wherein the mobile end device and the computing unit are configured for exchanging data.

\* \* \* \* \*